(12) United States Patent
Zhang et al.

(10) Patent No.: US 10,671,713 B2
(45) Date of Patent: Jun. 2, 2020

(54) METHOD FOR CONTROLLING UNLOCKING AND RELATED PRODUCTS

(71) Applicant: Guangdong Oppo Mobile Telecommunications Corp., Ltd., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 111 days.

(21) Appl. No.: 16/032,869

(22) Filed: Jul. 11, 2018

(65) Prior Publication Data
US 2019/0050548 A1    Feb. 14, 2019

(30) Foreign Application Priority Data
Aug. 14, 2017    (CN) .......................... 2017 1 0692318

(51) Int. Cl.
*G06F 21/32*    (2013.01)
*G06K 9/00*    (2006.01)
*G06K 9/62*    (2006.01)

(52) U.S. Cl.
CPC .......... *G06F 21/32* (2013.01); *G06K 9/00248* (2013.01); *G06K 9/00275* (2013.01);
(Continued)

(58) Field of Classification Search
CPC .......... G06K 9/00288; G06K 9/00281; G06K 9/00248; G06K 9/00275; G06K 9/629; G06F 21/32
(Continued)

(56) References Cited

U.S. PATENT DOCUMENTS

| 2013/0148898 A1* | 6/2013 | Mitura ..................... G06K 9/62 382/195 |
| --- | --- | --- |
| 2016/0171280 A1 | 6/2016 | Han et al. |

(Continued)

FOREIGN PATENT DOCUMENTS

| CN | 101494690 A | 7/2009 |
| --- | --- | --- |
| CN | 103353936 A | 10/2013 |

(Continued)

OTHER PUBLICATIONS

Perikos, et al. (Recognizing Emotions from Facial Expressions Using Neural Network), IFIP, pp. 236-245 . . . (Year: 2014).*

(Continued)

*Primary Examiner* — Daniel G Mariam
(74) *Attorney, Agent, or Firm* — Young Basile Hanlon & MacFarlane, P.C.

(57) ABSTRACT

A method for controlling unlocking and related products are provided. An electronic device includes at least one processor and a computer readable storage coupled to the at least one processor. The computer readable storage stores at least one computer executable instruction thereon, which when executed by the at least one processor, cause the at least one processor to carry out actions, including: obtaining a face image; carrying out a group of rough features and a group of fine features from the face image; carrying out a verification operation for the group of rough features and the group of the fine features; carrying out a next unlocking process when verification of the group of rough features and the group of fine features is passed.

14 Claims, 7 Drawing Sheets

(52) U.S. Cl.
   CPC ..... *G06K 9/00281* (2013.01); *G06K 9/00288* (2013.01); *G06K 9/629* (2013.01)

(58) Field of Classification Search
   USPC .................................................. 382/118, 218
   See application file for complete search history.

(56) References Cited

U.S. PATENT DOCUMENTS

| | | |
|---|---|---|
| 2016/0364610 A1 | 12/2016 | Jung et al. |
| 2017/0070680 A1 | 3/2017 | Kobayashi |
| 2019/0042831 A1* | 2/2019 | Ahn .................. G06K 9/00268 |

FOREIGN PATENT DOCUMENTS

| | | |
|---|---|---|
| CN | 106055961 A | 10/2016 |
| CN | 106127000 A | 11/2016 |
| CN | 106599841 A | 4/2017 |

OTHER PUBLICATIONS

Machine English Translation of Chinese Patent No. CN106599841a (Year: 2017).*

International search report issued in corresponding international application No. PCT/CN2018/096820 dated Oct. 22, 2018.

Supplementary partial European search report issued in corresponding European application No. 18180294.3 dated Jan. 17, 2019.

Rainhard Dieter Findling: "Pan Shot Face Unlock: Towards Unlocking Personal Mobile Devices Using Stereo Vision and Biometric Face Information From Multiple Perspectives"; Aug, 30, 2013; DOI: 10. 1108/IJPCC-05-2013-0012; sections 5, 7; figures 5.5, 7.1.

* cited by examiner

METHOD FOR CONTROLLING UNLOCKING AND RELATED PRODUCTS

CROSS-REFERENCE TO RELATED APPLICATION(S)

This application claims priority to Chinese Application Patent Serial No. 201710692318.4, filed on Aug. 14, 2017, the content of which is hereby incorporated by reference in its entirety.

TECHNICAL FIELD

This disclosure relates generally to the technical field of electronic device, and more particularly relates to a method for controlling unlocking and related products.

BACKGROUND

With the popularization and widespread use of electronic devices (mobile phones, tablet computers), applications supported by the electronic devices are more and more greater and performances of the electronic devices are more and more stronger, the electronic devices are developed in a direction of diversification and individualization and become necessary electronic products in user's life.

Nowadays, multi-biometric recognition is more and more popular by manufacturers of the electronic devices, as an important part of the multi-biometric recognition, the face recognition is paid more attention by each manufacturer. However, in practical use, an efficiency of the face recognition is relative low, a problem that how to enhance the efficiency of the face recognition is needed to be resolved as soon as quickly.

SUMMARY

Implementations of the disclosure provide a method for controlling unlocking and related products, to improve efficiency of the face recognition.

According to a first aspect of the implementations of the disclosure, an electronic device is provided, which includes an application processor (AP) and a face recognition device coupled to the AP, therein, the face recognition device is configured to obtain a face image; the AP is configured to extract a group of rough features and a group of fine features; carry out a verification operation for the group of rough features and the group of fine features; and carry out a next unlocking process when verification of the group of rough features and the group of fine features is passed.

According to a second aspect of the implementations of the disclosure, a method for controlling unlocking is provided, which includes: obtaining a face image; extracting a group of rough features and a group of fine features from the face image; carrying out a verification operation for the group of rough features and the group of the fine features; carrying out a next unlocking process when verification of the group of rough features and the group of fine features is passed.

According to a third aspect of the implementations of the disclosure, there is provided a non-transitory computer-readable storage medium storing a computer program which, when executed by a processor, causes the processor to carry out actions: obtaining a face image; extracting a group of rough features and a group of fine features from the face image; carrying out a verification operation for the group of rough features and the group of the fine features; carrying out a next unlocking process when verification of the group of rough features and the group of fine features is passed.

BRIEF DESCRIPTION OF THE DRAWINGS

In order to illustrate the technical solutions of the related art or the implementations of the present disclosure more clearly, the drawings used in the description of the implementations or the related art will be briefly described, it will be apparent that the drawings described in the following are implementations of the present disclosure, and it will be apparent to those skilled in the art that other drawings can be obtained from the drawings without any creative work.

DETAILED DESCRIPTION

In order to make a person skilled in the art to better understand the solutions of the present disclosure, the technical solutions in the implementations of the present disclosure will be described below clearly and completely in conjunction with the accompanying drawings in the implementations of the present disclosure. Obviously, the described implementations are some implementations of the present disclosure, not all of the implementations. On the basis of the implementations in the present disclosure, all other implementations obtained by a person skilled in the art without creative work should fall within the scope of protection of the present disclosure.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "implementation" or "embodiment" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

The electronic devices referred in the implementations of the present disclosure may include hand-held devices with wireless connectivity function, on-board devices, computing devices or other processing devices connected to a wireless modem and user equipment (UE), mobile stations (MS), electronic devices of various forms. In order to facilitate to describe, the above devices are collectively called electronic devices.

It is should be illustrated that the electronic device of the implementations of the present disclosure may install a multi-biometric recognition device, namely multiple biometric recognition devices, besides including a face recognition device, the multiple biometric recognition devices may further include but not limited to: a fingerprint recognition device, an iris recognition device, a vein recognition device, a brain wave recognition device, an electrocardiogram recognition device, and the like. Each biometric recognition device may have a corresponding recognition algorithm and a recognition threshold value. Besides, each biometric recognition device may have templates corresponded to it and input by the user previously, for example, the face recognition device may have preset face templates, and the face recognition device may capture a face image and the recognition is passed when a match value between the face image and one preset image template is greater than the corresponding recognition threshold value.

Figure 1A:
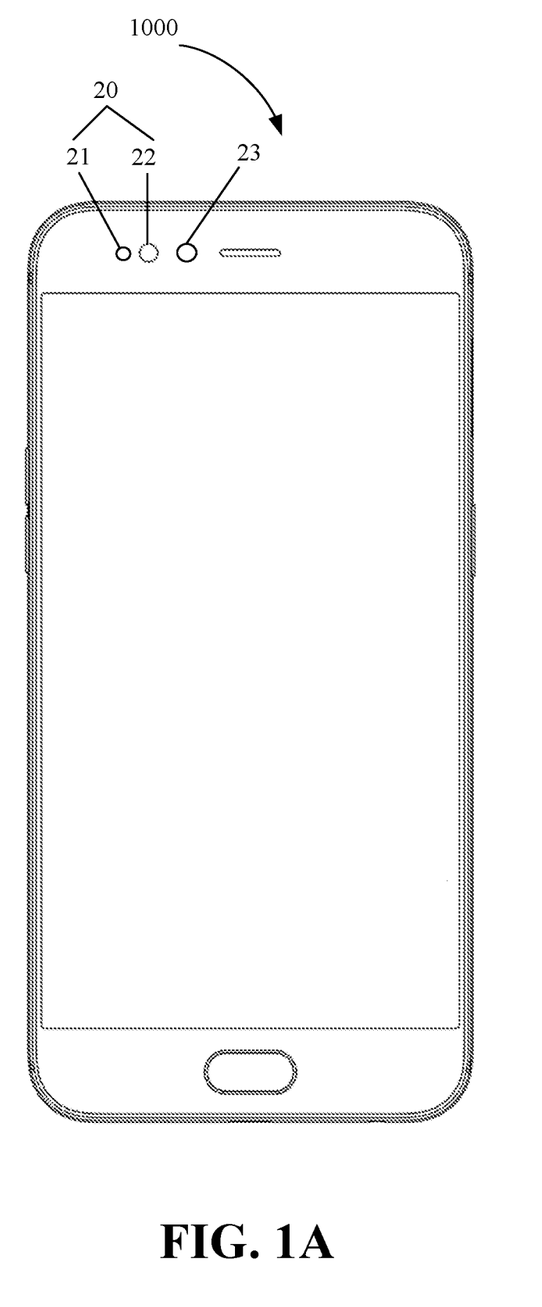
FIG. 1A is a framework schematic diagram of an illustrated electronic device according to an implementation of the disclosure.

The implementations of the present disclosure are described in detail below. An illustrated electronic device 1000 as illustrated in FIG. 1A, the iris recognition device of the electronic device 1000 may include an infrared supplement light 21 and an infrared camera 22. During a work process of the iris recognition device, after the light of the infrared supplement light 21 is projected to an iris, the light is reflected to the infrared camera 22 via the iris, the iris recognition device captures an iris image, and a front camera 23 may be used as the face recognition device.

Figure 1B:
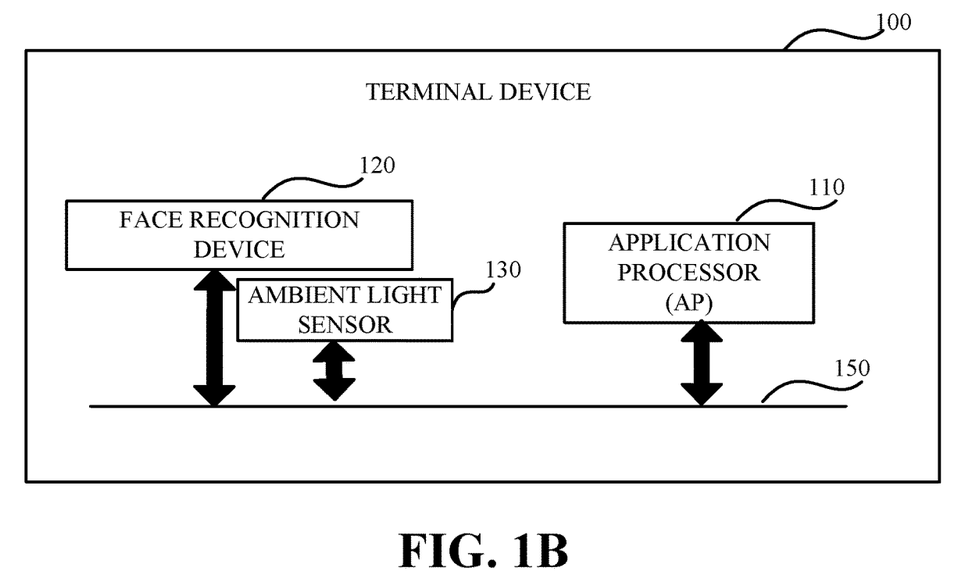
FIG. 1B is a structure schematic diagram of an electronic device according to an implementation of the disclosure.

Please referring to FIG. 1B, FIG. 1B is a structure schematic of an electronic device 100, the electronic device at least includes: an application processor (AP) 110, a face recognition device 120, and an ambient light sensor 130, therein, the AP 110 couples to the face recognition device 120 and the ambient light sensor 130 via a bus line 150.

In a possible implementation, the electronic device illustrated in FIG. 1A or FIG. 1B may have the following functions, details as follows:

The face recognition device 120 is configured to obtain a face image; the AP 110 is configured to extract a group of rough features and a group of fine features, carry out a verification operation for the group of rough features and the group of fine features, carry out a next unlocking process when verification of the group of rough features and the group of fine features is passed.

In a possible implementation, in the aspect of extracting the group of rough features and the group of fine features from the face image, the AP 110 is further configured to: carry out outline extraction for the face image to obtain an outline as the group of rough features; carry out image segmentation for the face image to obtain at least one facial feature area; carry out feature point extraction for the at least one facial feature area to obtain multiple feature points as the group of fine features.

In a possible implementation, in the aspect of carrying out a verification operation for the group of rough features and the group of fine features, the AP 110 is further configured to: determine a first gravity center of the face image according to the group of rough features; determine a first Euclidean distance between the first gravity center and a preset second gravity center; determine a first mass center according to the group of fine features when the first Euclidean distance is within a first preset range; determine a second Euclidean distance between the first mass center and a preset second mass center; determine that the verification is passed when the second Euclidean distance is within a second preset range.

In a possible implementation, the ambient light sensor 130 is configured to obtain ambient brightness; the AP 110 is configured to determine a first lower threshold value, a first recognition threshold value, a second lower threshold value, and a second recognition threshold value, corresponding to the ambient brightness.

In the aspect of carrying out verification operation for the group of rough features and the group of fine features, the AP 110 is further configured to: determine a first match value between the group of rough features and a preset group of rough features; determine a second match value between the group of fine features and a preset group of fine features; determine that the verification is passed when the first match value is greater than the first lower threshold value, the second match value is greater than the second lower threshold value, and a sum of the first match value and the second match value is greater than a sum of the first recognition threshold value and the second recognition threshold value.

In a possible implementation, the AP 110 is further configured to: determine an average brightness value of the face image; carry out the operation of extracting the group of rough features and the group of fine features from the face image when the average brightness value is lower than a preset brightness value.

In a possible implementation, based on the electronic device illustrated in FIG. 1A and FIG. 1B, a method for controlling unlocking may be carried out as follows:

The face recognition device 120 obtains the face image; the AP 110 extracts the group of rough features and the group of fine features from the face image; carries out a verification operation for the group of rough features and the group of fine features; and carries out a next unlocking process when the verification of the group of rough features and the group of fine features is passed.

It is observed that, in the implementations of the present disclosure, the electronic device may obtain the face image, extract the group of rough features and the group of fine features, carry out the verification operation for the group of rough features and the group of fine features; and carry out the next unlocking process when the verification of the group of rough features and the group of fine features is passed. Thereby, in the implementations of the present disclosure, by both verifying the group of rough features and the group of fine features extracted from the face image, the next unlocking process is carried out only if the verification of them are both passed, thereby, which can be used to achieve the face recognition and the security of the electronic device is enhanced.

Figure 1C:
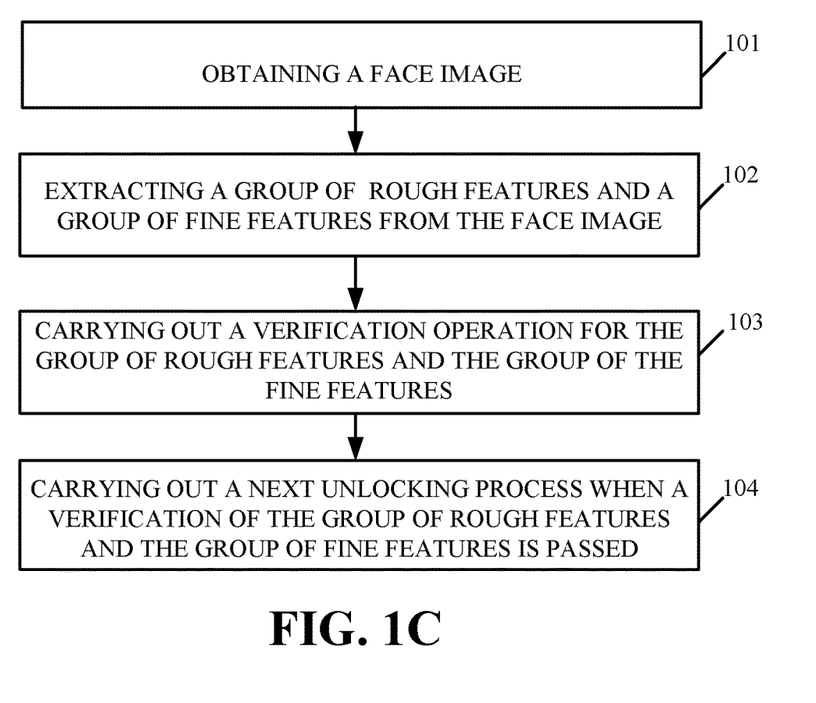
FIG. 1C is a schematic flowchart illustrating a method for controlling unlocking according to an implementation of the disclosure.

Please referring to FIG. 1C, which is a schematic flow chart illustrating a method for controlling unlocking provided by an implementation of the present disclosure. The method for controlling unlocking described in the present implementation is applied to an electronic device, figures of real product and structure of the electronic device may refer to FIG. 1A and FIG. 1B, the method includes the following operations:

At block 101, a face image is obtained.

Therein, the electronic device may obtain the face image via a face recognition device, the face recognition device may be a camera, or, other image capturing devices.

At block 102, a group of rough features and a group of fine features are extracted from the face image.

In one implementation of the present disclosure, the group of rough features may be a total feature included in the face image, such as an outline of a face, the group of fine features may feature points of at least one area included in the face image, such as multiple feature points of at least one facial feature area of the face.

Therein, the face image may include the group of rough features and the group of fine features, it may be understood that, in some implementations of the present disclosure, the group of fine features are those features represented more detailed while comparing to the group of rough features. For example, the group of rough features may be the outline and the group of fine features may be feature points. For another example, the group of rough features may be an average gray value of the face image, and the group of fine features may be the outline. Of course, the group of rough features and the group of fine features are two definitions of different precisions. In a word, the group of fine features is more detailed while comparing to the group of rough features, and can represent the detail features of the image better. The group of rough features and the group of fine features both include more features.

Alternatively, in the block 102 described above, the group of rough features and the group of fine features are extracted from the face image, may further include operations as follows:

At 21, outline extraction is carried out for the face image to obtain an outline as the group of the rough features.

At 22, at least one facial feature area is obtained by carrying out image segmentation for the face image.

At 23, feature point extraction is carried out for the at least one facial feature area to obtain multiple features points, the obtained multiple feature points are taken as the group of fine features.

Therein, the electronic device can extract the outline extraction for the face image, thus the obtained outline is taken as the group of rough features, the method of outline extraction may include at least one selected from: Hough transform, principal component analysis, morphological method, and the like. Because the obtained outline may be multiple line segments after carrying out the outline extraction for the image, the multiple line segments are taken as the rough features. The electronic device may further carry out image segmentation for the face image to obtain the at least one facial feature area, and then carry out feature point extraction for the at least one facial feature area to obtain multiple feature points, the multiple feature points may be taken as the group of fine features. The at least one facial feature area can be at least one area selected from: eyes, ears, a nose, eyebrows, and a mouse. The feature extraction may be achieved by adopting the following algorithms: a Harris corner detection algorithm, a scale invariant feature transform (SIFT), a Susan corner detection algorithm, and the like.

Alternatively, the operation at 21 and the operation at 22 may be carried out in parallel, namely, the operation at 21 and the operation at 22 may be carried out at the same time.

At block 103, a verification operation is carried out for the group of rough features and the group of the fine features.

Therein, when the electronic device carrying out the operation at block 103, the electronic device may first carry out the verification for the group of rough features, and then carry out the verification for the group of fine features after the verification of the group of rough features is passed; or, may first carry out the verification for the group of fine features, and then carry out the verification for the group of rough features after the verification of the group of fine features is passed; or a process of doing verification operation for the group of rough features and a process of doing verification for the group of fine features may be carried out in parallel.

Alternatively, at the block 103, the verification operation is carried out for the group of rough features and the group of the fine features, may include the following operations:

At A1, a first gravity center of the face image is determined according to the group of rough features.

At A2, a first Euclidean distance between the first gravity center and a preset second gravity center is determined.

At A3, a first mass center is determined according to the group of fine features when the first Euclidean distance is within a first preset range.

At A4, a second Euclidean distance between the first mass center and a preset second mass center is determined.

At A5, verification is determined to be passed when the second Euclidean distance is within a second preset range.

Therein, the first preset range, the second preset range may be set by system default or set by the user himself, the preset second gravity center and the preset second mass center are both obtained from preset face image templates. Of course, for one image, there is a unique gravity center and a unique mass center, therefore, for the face image, it also has a unique gravity center and a unique mass center. Because the face of each people is unique, then the gravity center and the mass center are also unique. In practical use, because a photographing angle, a photographing distance, shake and other factors would cause the face image to have some difference and changes of shape, in the implementation of the present disclosure, the features of the face image are further located by adopting the group of rough features and the group of fine features, the geometrical characteristics of the face image may be represented more reasonable. In a practical implementation, the first gravity center of the face image is determined according to the group of rough features, of course, because each feature of the group of rough features may be represented in a coordinate system, it may be easy to calculate the gravity center of the group of rough features. Furthermore, the first Euclidean distance is obtained by determining a Euclidean distance between the first gravity center and the preset second gravity center, because the gravity center of the same people would not differ too much, the face image may be verified to whether is matched by this manner to a certain degree; when the first Euclidean distance is within the first preset range, then the first mass center is determined according to the group of fine features, and a second Euclidean distance is obtained by determining a Euclidean distance between the first mass center and a preset second mass center, and the verification is determined to be passed when the second Euclidean distance is within the second preset range. Therefore, whether the face image is matched may be verified by geometry manner to a certain degree.

Alternatively, between the block 102 and the block 103, there are further operations are contained as follows:

An ambient brightness is obtained; a first lower threshold value, a first recognition threshold value, a second lower threshold value, and a second recognition threshold value corresponding to the ambient brightness are determined. At the block 103, the verification operation is carried out for the group of rough features and the group of the fine features may include the following operations:

At B1, a first match value between the group of rough features and a preset group of rough features is determined.

At B2, a second match value between the group of fine features and a preset group of fine features is determined.

At B3, when the first match value is greater than the first lower threshold value, the second match value is greater than the second lower threshold value, and a sum of the first match value and the second match value is greater than a sum of the first recognition threshold value and the second recognition threshold value, the verification is determined to be passed.

Therein, the preset group of rough features and the preset group of fine features are both obtained from preset face templates, the preset face templates are stored in a memory of the electronic device. The electronic device may previously store mapping relationships between the ambient brightness with the first lower threshold value, the first recognition threshold value, the second lower threshold value, and the second recognition threshold value. After detecting the ambient brightness via the ambient light sensor, the first lower threshold value, the first recognition threshold value, the second lower threshold value, and the second recognition threshold value corresponding to the ambient brightness may be determined according to the mapping relationships. Thereby, the match value between the group of rough features and the preset group of rough features is determined to obtain the first match value, the match value between the group of fine features and the preset group of fine features is determined to obtain the second match value, and the verification is determined to be passed when the first match value is greater than the first lower threshold value, the second match value is greater than the second lower threshold value, and a sum of the first match value and the second match value is greater than a sum of the first recognition threshold value and the second recognition threshold value. For example, the first lower threshold value is 0.45, the first recognition threshold value is 0.7, the second lower threshold value is 0.5, and the second recognition threshold value is 0.8 are taken as example, for example, the first match value is 0.6, the second match value is 0.7, although the first match value (0.6) is greater than 0.45 and the second match value (0.7) is greater than 0.5, due to the sum (0.6+0.7) of the first match value and the second match value is less than the sum (0.7+0.8) of the first recognition threshold value and the second recognition threshold value, thereby, the match is failed. If the first match value is 0.95, the second match value is 0.66, the first match value (0.95) is greater than 0.45 and the second match value (0.7) is greater than 0.5, the sum (0.95+0.66) of the first match value and the second match value is greater than the sum (0.7+0.8) of the first recognition threshold value and the second recognition threshold value, thereby, the match is successful. Therefore, the method can have a degree of freedom in face recognition operations, for example, the efficiency of the face recognition is enhanced when the user's face is obliquity, the angle is not good, and the light is poor.

At block 104, a next unlocking process is carried out when the verification of the group of rough features and the group of fine features is passed.

Therein, the next unlocking process, may be at least one situation below, for example, the electronic device is at a screen-off state, then the next unlocking process is: lighting up a screen of the electronic device and enter a desktop. In a further example, the electronic device is at screen-on state, then the next unlocking process is: entering the desktop, or starting up a designated application, or entering a designated page. In a further example, in a multi-biometric recognition mode, the next unlocking process is: entering a next recognition stage, such as, for the face recognition plus fingerprint recognition, after the face recognition is passed, then the fingerprint recognition stage may be entered.

Alternatively, at the block 104, the next unlocking process is carried out may be implemented according to the following method: a corresponding use instruction is generated according to the group of fine features, and the electronic device is controlled according to the user instruction.

Therein, when the group of fine features is a group of feature points, mapping relationships between different numbers of the feature points and different user instructions may be established previously, then the user instruction corresponding to the group of fine features may be determined according to the mapping relationships, then the electronic device may be controlled according to the user instruction. The user instruction may be an application start-up instruction, an application close instruction, an unlocking instruction, a jump instruction, a switching instruction, and the like. Therein, the application start-up instruction is configured to start up one application, the application close instruction is configured to close one application, the unlocking instruction may be configured to enter the desktop, make a payment, and the like, the jump instruction may be configured to jump to one page, the switching instruction may be configured to switch songs, wallpapers, and the like.

It is observed that, in the implementations of the present disclosure, the electronic device can obtain the face image, and extract the group of rough features and the group of fine features from the face image, carry out the verification operation for the group of rough features and the group of fine features, and carry out the next unlocking process when the verification of the group of rough features and the group of fine features are passed. Thereby, in the implementations of the present disclosure, by both verifying the group of rough features and the group of fine features extracted from the face image, the next unlocking process is carried out only if the verification of them are both passed, therefore, which can be used to achieve the face recognition and the security of the electronic device is enhanced.

Figure 2:
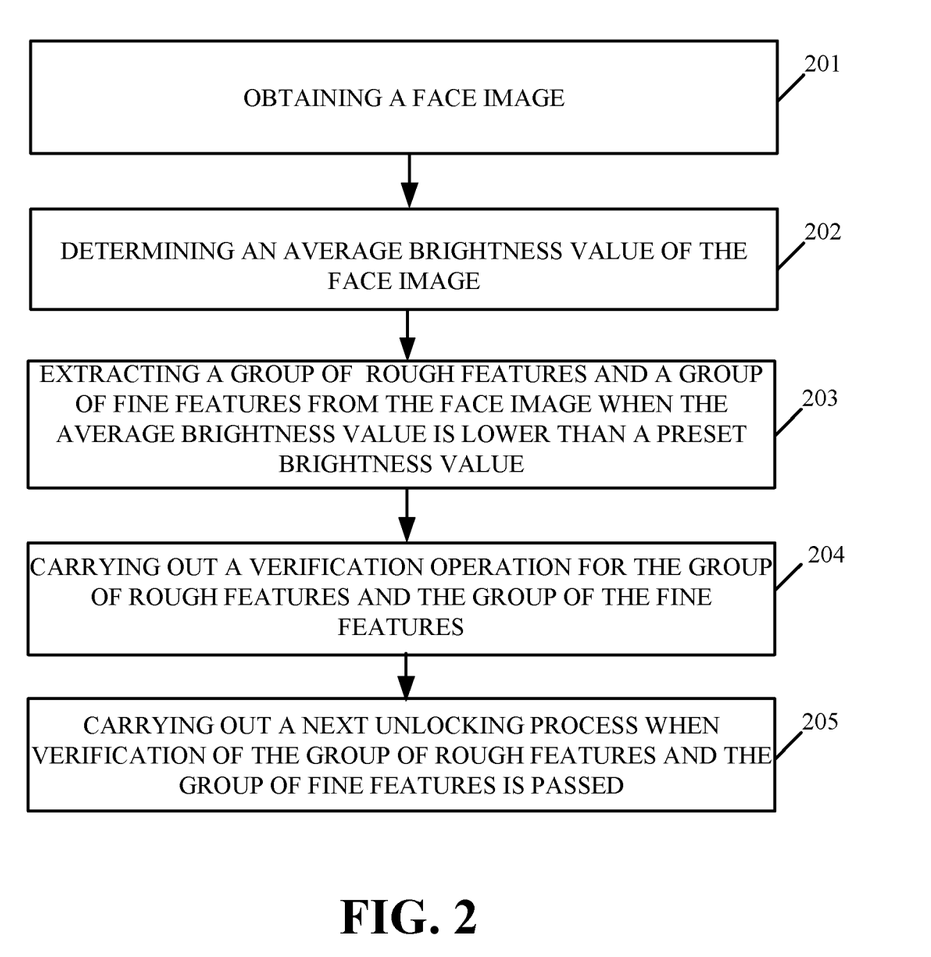
FIG. 2 is a schematic flowchart illustrating a method for controlling unlocking according to another implementation of the disclosure.

FIG. 2 is a schematic flow chart illustrating another method for controlling unlocking provided by an implementation of the present disclosure. The method for controlling unlocking described in the present implementation is applied to an electronic device, figures of real product and structure of the electronic device may refer to FIG. 1A and FIG. 1B, the method includes the following operations:

At 201, a face image is obtained.

At 202, an average brightness value of the face image is determined.

Therein, the electronic device may extract a brightness constituent from the face image, then calculate the average brightness value according to the brightness constituent, for example, an average value of the brightness of all pixels of the brightness constituent may be taken as the average brightness value.

At 203, the group of rough features and the group of fine features may be extracted from the face image when the average brightness value is lower than a preset brightness value.

Therein, the preset brightness value may be set by the user himself or system default. The implementations of the present disclosure also can be applied to dark environment, in this situation, the efficiency of the face recognition may be enhanced by combining the rough features and the fine features to finish the face recognition.

At 204, a verification operation is carried out for the group of rough features and the group of fine features.

At 205, a next unlocking process is carried out when the verification of the group of rough features and the group of fine features are passed.

Therein, the detail description of the block 201, blocks 203-205 may refer to corresponding blocks illustrated in FIG. 1C, here does not to describe in detail again.

It is observed that, in the implementations of the present disclosure, the electronic device can obtain the face image, and determine the average brightness value of the face image, extract the group of rough features and the group of fine features from the face image when the average brightness value is lower than the preset brightness value, carry out the verification operation for the group of rough features and the group of fine features, and carry out the next unlocking process when the verification of the group of rough features and the group of fine features are passed. Thereby, in the implementations of the present disclosure, by both verifying the group of rough features and the group of fine features extracted from the face image, the next unlocking process is carried out only if the verification of them are both passed, therefore, which can be used to achieve the face recognition and the security of the electronic device is enhanced.

Figure 3:
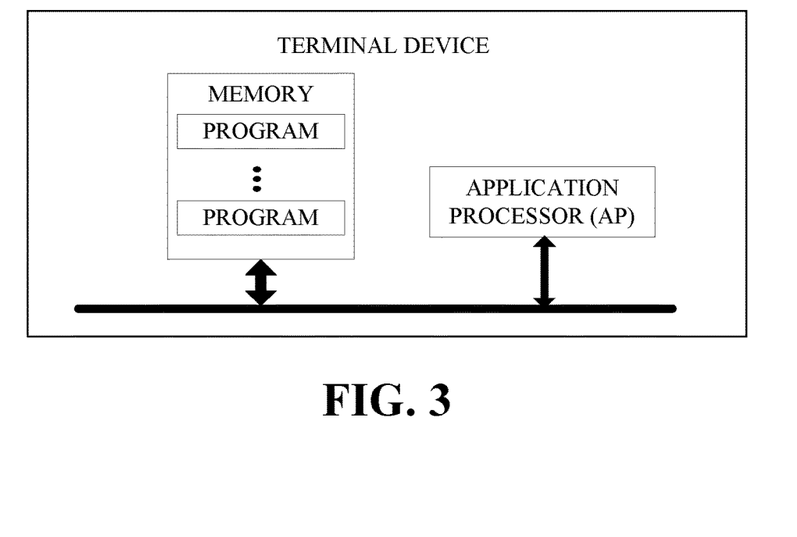
FIG. 3 is another structure schematic diagram of an electronic device according to an implementation of the disclosure.

FIG. 3 illustrates an electronic device provided by an implementation of the present disclosure. As illustrated in FIG. 3, the electronic device includes: an application processor (AP) and a memory; and one or more programs. The one or more programs are stored in the memory, and are configured to be carried out by the AP. The programs include instructions configured to carry out the following operations.

A face image is obtained.

A group of rough features and a group of fine features are extracted from the face image.

A verification operation is carried out for the group of rough features and the group of the fine features.

A next unlocking process is carried out when the verification of the group of rough features and the group of fine features is passed.

In a possible implementation, in the aspect that the group of rough features and the group of fine features are extracted from the face image, the programs include instructions configured to carry out the following operations.

Outline extraction is carried out for the face image to obtain an outline as the group of the rough features.

At least one facial feature area is obtained by carrying out image segmentation for the face image.

Feature point extraction is carried out for the at least one facial feature area to obtain multiple features points, and the obtained multiple feature points are taken as the group of fine features.

In a possible implementation, in the aspect that the verification operation is carried out for the group of rough features and the group of the fine features, the programs include the following operations.

A first gravity center of the face image is determined according to the group of rough features.

A first Euclidean distance between the first gravity center and a preset second gravity center is determined.

A first mass center is determined according to the group of fine features when the first Euclidean distance is within a first preset range.

A second Euclidean distance between the first mass center and a preset second mass center is determined.

Verification is determined to be passed when the second Euclidean distance is within a second preset range.

In a possible implementation, the programs further include instructions configured to carry out the following operations:

An ambient brightness is obtained; a first lower threshold value, a first recognition threshold value, a second lower threshold value, and a second recognition threshold value corresponding to the ambient brightness are determined.

In the aspect that the verification operation is carried out for the group of rough features and the group of the fine features, the programs include the following operations:

A first match value between the group of rough features and a preset group of rough features is determined.

A second match value between the group of fine features and a preset group of fine features is determined.

The verification is determined to be passed, when the first match value is greater than the first lower threshold value, the second match value is greater than the second lower threshold value, and a sum of the first match value and the second match value is greater than a sum of the first recognition threshold value and the second recognition threshold value.

In a possible implementation, the programs further include instructions configured to carry out the following operations.

An average brightness value of the face image is determined; the operation that the group of rough features and the group of fine features is extracted from the face image is carried out, when the average brightness value is lower than a preset brightness value.

Figure 4A:
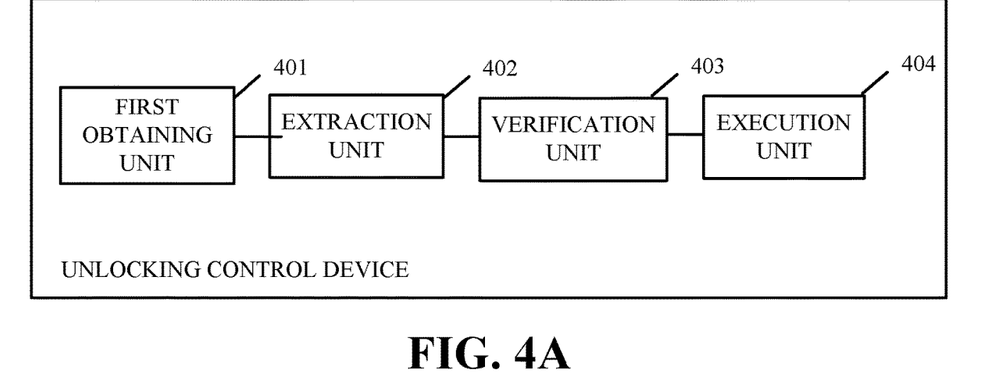
FIG. 4A is a structure schematic diagram of an unlocking control device according to an implementation of the disclosure.

Please referring to FIG. 4A, which is a structure schematic diagram of an unlocking control device provided by the present implementation. The unlocking control device is applied to an electronic device, the unlocking control device includes a first obtaining unit 401, an extraction unit 402, a verification unit 403, and an execution unit 404, therein, the first obtaining unit 401 is configured to obtain a face image.

The extraction unit 402 is configured to extract a group of rough features and a group of fine features from the face image.

The verification unit 403 is configured to carry out a verification operation for the group of rough features and the group of the fine features.

The execution unit 404 is configured to carry out a next unlocking process when the verification of the group of rough features and the group of fine features are passed.

Figure 4B:
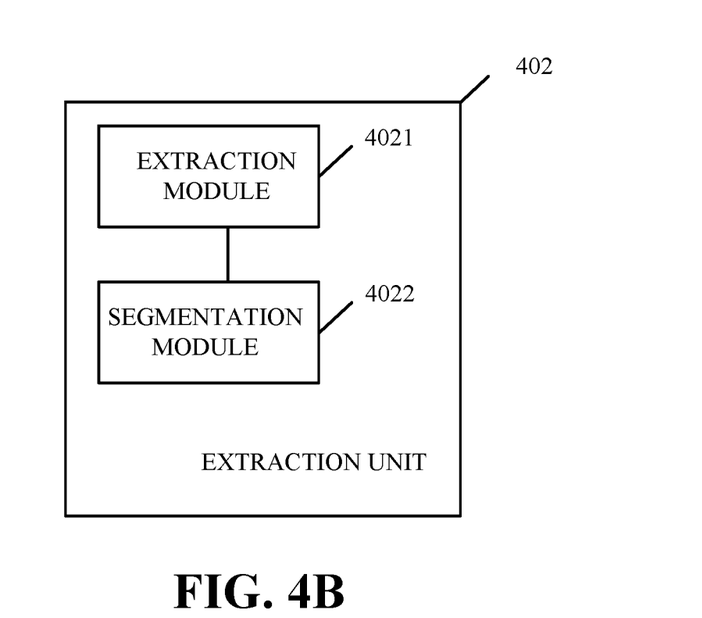
FIG. 4B is a structure schematic diagram of an extraction unit of the unlocking control device illustrated in FIG. 4A according to an implementation of the disclosure.

Alternatively, as illustrated in FIG. 4B, which illustrates a detailed structure of the extraction unit 402 of the unlocking control device illustrated in FIG. 4A. The extraction unit

402 may include: an extraction module 4021 and a segmentation module 4022, details as below.

The extraction module 4021 is configured to carry out outline extraction for the face image, and an obtained outline is taken as the group of the rough features.

The segmentation module 4022 is configured to carry out image segmentation for the face image to obtain at least one facial feature area.

The extraction module 4021 is further configured to carry out feature point extraction for the at least one facial feature area to obtain multiple features points, and the obtained multiple feature points are taken as the group of fine features.

Figure 4C:
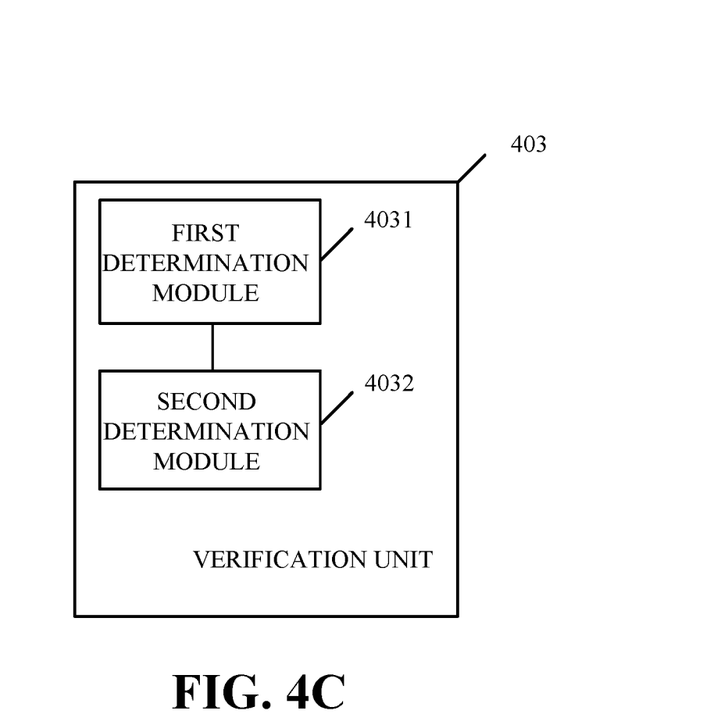
FIG. 4C is a structure schematic diagram of a verification unit of the unlocking control device illustrated in FIG. 4A according to an implementation of the disclosure.

Alternatively, as illustrated in FIG. 4C, which illustrates a detailed structure of the verification unit 403 of the unlocking control device illustrated in FIG. 4A. The verification unit 403 may include: a first determination module 4031 and a second determination module 4032, details as below:

The first determination module 4031 is configured to determine a first gravity center of the face image according to the group of rough features.

The first determination module 4031 is further configured to: determine a first Euclidean distance between the first gravity center and a preset second gravity center.

The second determination module 4032 is configured to determine a first mass center according to the group of fine features when the first Euclidean distance is within a first preset range.

The second determination module 4032 is further configured to:

Determine a second Euclidean distance between the first mass center and a preset second mass center; and determine verification is passed when the second Euclidean distance is within a second preset range.

Figure 4D:
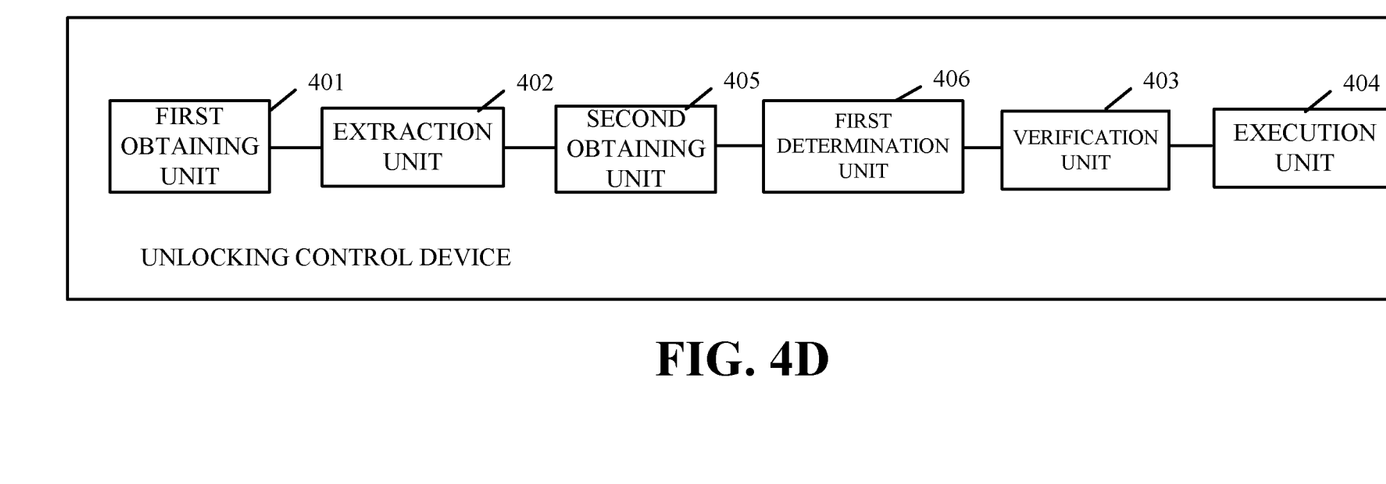
FIG. 4D is another structure schematic diagram of the unlocking control device illustrated in FIG. 4A according to an implementation of the disclosure.

Alternatively, as illustrated in FIG. 4D, which is a modified structure of the unlocking control device illustrated in FIG. 4A. Compared with FIG. 4A, the unlocking control device illustrated in FIG. 4D may further include: a second obtaining unit 405 and a first determination unit 406, details as below:

The second obtaining unit 405 is configured to obtain an ambient brightness.

The first determination unit 406 is configured to determine a first lower threshold value, a first recognition threshold value, a second lower threshold value, and a second recognition threshold value corresponding to the ambient brightness.

The verification unit 403 is further configured to:

Determine a first match value between the group of rough features and a preset group of rough features.

Determine a second match value between the group of fine features and a preset group of fine features.

determine that the verification is passed, when the first match value is greater than the first lower threshold value, the second match value is greater than the second lower threshold value, and a sum of the first match value and the second match value is greater than a sum of the first recognition threshold value and the second recognition threshold value.

Figure 4E:
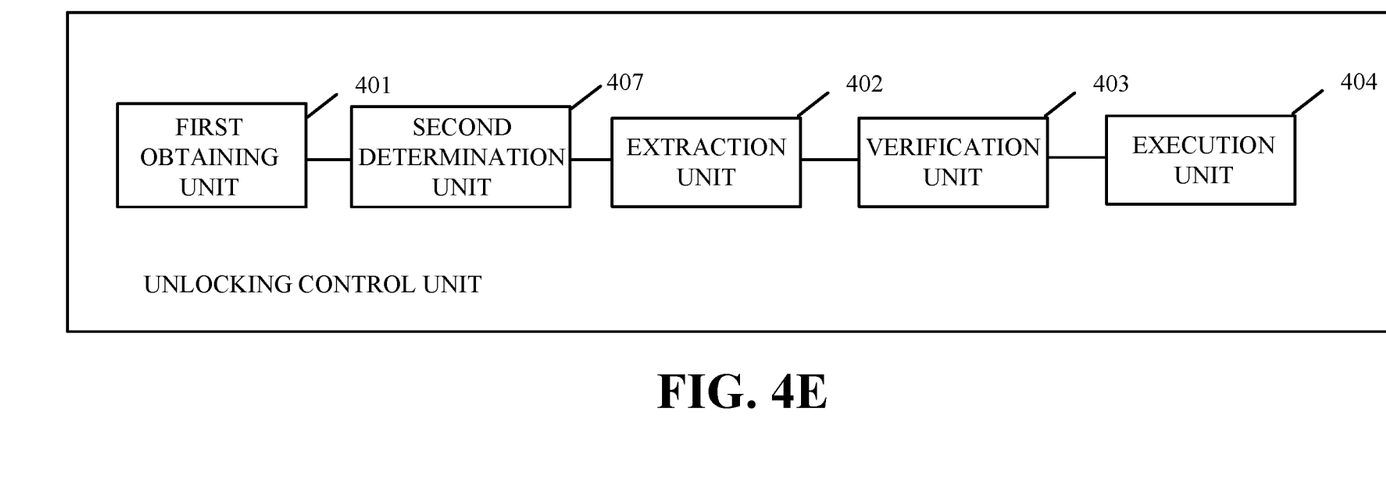
FIG. 4E is a further another structure schematic diagram of the unlocking control device illustrated in FIG. 4A according to an implementation of the disclosure.

Alternatively, as illustrated in FIG. 4E, which is another modified structure of the unlocking control device illustrated in FIG. 4A. Compared with FIG. 4A, the unlocking control device illustrated in FIG. 4E may further include: a second determination unit 407, details as below:

The second determination unit 407 is configured to determine an average brightness value of the face image; and the extraction unit 402 carries out the operation of extracting the group of rough features and the group of fine features from the face image when the average brightness value is lower than a preset brightness value.

It should be understood, the functions of each program module of the unlocking control device may be achieved in detail according to the method of the above method implementations, the detailed achieve process may be referred to related illustrations of the above method implementations, here does not describe in detail again.

Figure 5:
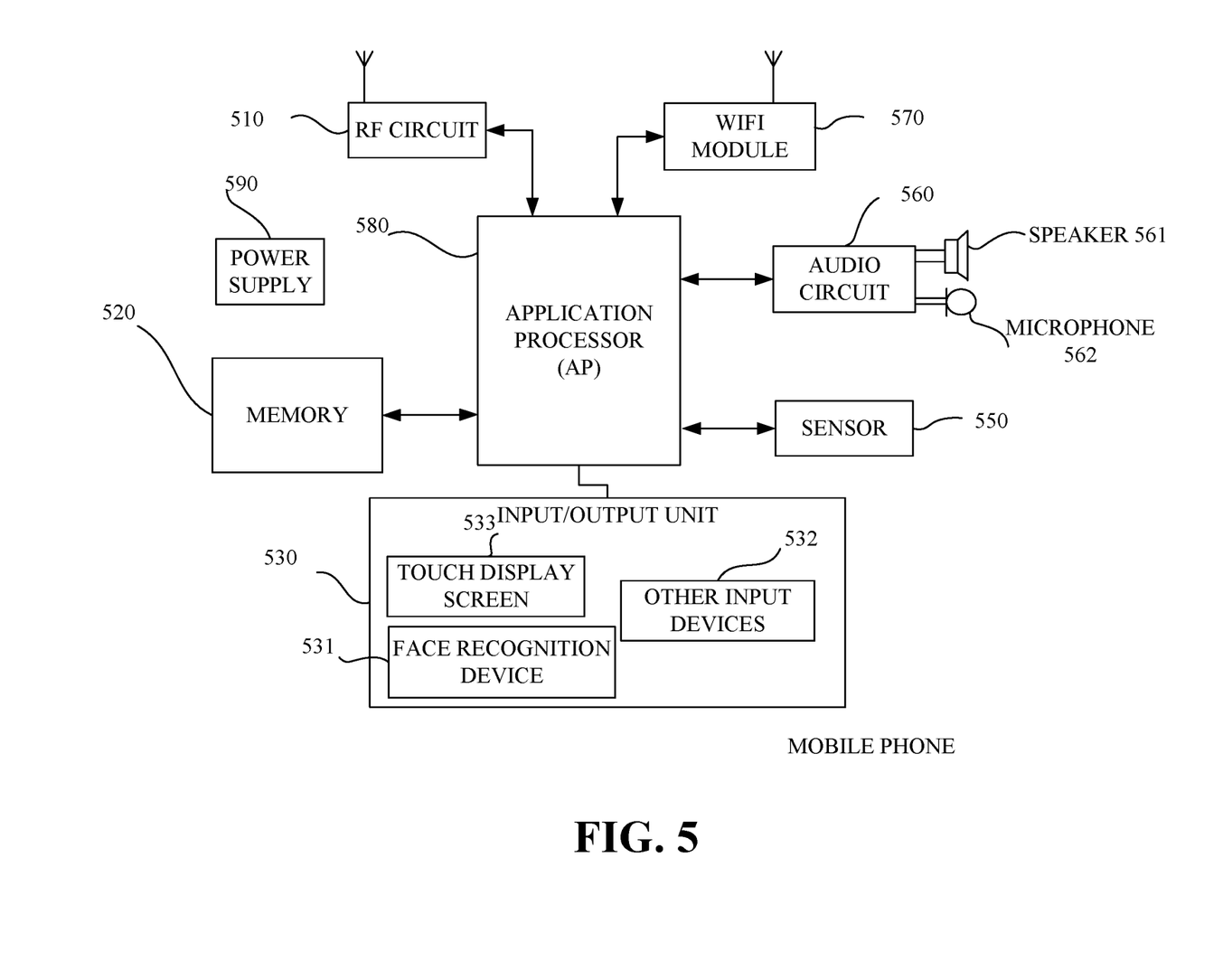
FIG. 5 is structure schematic diagram of another electronic device according to an implementation of the disclosure.

Implementations of the disclosure provide another electronic device. As illustrated in FIG. 5, only parts related to the implementation of the disclosure are illustrated for the convenience of description. For technical details not described, reference may be made to the method implementations of the present disclosure. The electronic device may be any electronic device, such as a mobile phone, a tablet computer, a personal digital assistant (PDA), a point of sale terminal (POS), an on-board computer, and the like. The following describes a mobile phone as an example of the electronic device.

FIG. 5 is a block diagram of a part of a structure of a mobile phone related to an electronic device according to an implementation of the disclosure. Referring to FIG. 5, the mobile phone includes an RF (radio frequency) circuit 510, a memory 520, an input/output unit 530, a sensor 550, an audio circuit 560, a Wi-Fi (wireless fidelity) module 570, an application processor (AP) 580, and a power supply 590 and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 5.

The input/output unit 530 may be configured to receive input digital or character information and generate key signal input associated with user setting and function control of the mobile phone. As one implementation, the input/output unit 530 may include a touch display screen 533, a face recognition device 531 and other input devices 532. The detail structures and components of the face recognition device 531 may refer to the above descriptions, here does not describe in detail again. The input/output unit 530 may further include the other input devices 532. As one implementation, the other input devices 532 may include, but not limited to, one or more of a physical keyboard, a function key (such as a volume control key, a switch key, etc.), a trackball, a mouse, a joystick, and the like.

Therein, the AP 580 is configured to perform the following operations:

A face image is obtained; a group of rough features and a group of fine features are extracted from the face image; a verification operation is carried out for the group of rough features and the group of the fine features; and a next unlocking process is carried out when the verification of the group of rough features and the group of fine features are passed.

The AP 580 is a control center of the mobile phone, which connects or couples various parts of the entire mobile phone through various interfaces and lines. By running or executing software programs and/or modules stored in the memory 520 and invoking data stored in the memory 520, the AP 580 can carry out various functions of the mobile phone and conduct data processing, so as to monitor the mobile phone as a whole. The AP 580 may include one or more processing units, the processing units may be artificial intelligence chips, quantum chips. The AP 580 may be integrated with an application processor and a modem processor, where the application processor is mainly configured to handle an operating system, a user interface, applications, and so on. The modem processor is mainly configured to deal with wireless communication. It will be appreciated that the modem processor mentioned above may not be integrated into the AP 580. Obviously, the mobile phone may further include one or more other processors, such as a central processing unit, a single chip, a digital signal processor.

In addition, the memory 520 may include a high-speed RAM, and may further include a non-volatile memory such as at least one disk storage device, a flash device, or other non-volatile solid storage devices.

The RF circuit 510 is configured to receive or transmit information. Generally, the RF circuit 510 includes but is not limited to an antenna, at least one amplifier, a transceiver, a coupler, a low noise amplifier (LNA), a duplexer and the like. In addition, the RF circuit 510 may also communicate with other devices via wireless communication and the network. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The mobile phone may also include at least one sensor 550, such as a light sensor, a motion sensor, and other sensors. As one implementation, the light sensor may include an ambient light sensor and a proximity sensor, among which the ambient light sensor may adjust brightness of the touch display screen 533 according to ambient lights. The proximity sensor may turn off the touch display screen 533 and/or backlight when the mobile phone reaches nearby the ear. As a kind of the motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 560, a speaker 561, a microphone 562 may provide an audio interface between the user and the mobile phone. The audio circuit 560 may convert the received audio data into electrical signals and transfer the electrical signals to the speaker 561; thereafter the speaker 561 converts the electrical signals into sound signals to output. On the other hand, the microphone 562 converts the received sound signals into electrical signals, which will be received and converted into audio data by the audio circuit 560 to output. The audio data is then processed and transmitted by the AP 580 via the RF circuit 510 to another mobile phone for example, or, the audio data is output to the memory 520 for further processing.

Wi-Fi belongs to a short-range wireless transmission technology. With aid of the Wi-Fi module 570, the mobile phone may assist the user in E-mail receiving and sending, webpage browsing, access to streaming media and the like. Wi-Fi provides users with wireless broadband Internet access. Although the Wi-Fi module 570 is illustrated in FIG. 6, it should be understood that the Wi-Fi module 570 is not essential to the mobile phone and can be omitted according to actual needs without departing from the essential nature of the present disclosure.

The mobile phone also includes a power supply 590 (e.g., a battery) that supplies power to various components. For instance, the power supply 590 may be logically connected to the AP 580 via a power management system to enable management of charging, discharging, and power consumption through the power management system.

Although not illustrated, the mobile phone may further include a camera, a Bluetooth module, etc., and the disclosure will not elaborate herein.

In the implementations illustrated in FIG. 1C and FIG. 2, each operation may be achieved based on the structure of the mobile phone.

In the implementations illustrated in FIG. 3, FIGS. 4A-4E, the function of each unit may be achieved based on the structure of the mobile phone.

Implementations of the present disclosure also provide a non-transitory computer-readable storage medium, on which a computer program is stored. The computer program is executed by a processor to carry out following actions. First, a face image is obtained. A group of rough features and a group of fine features are extracted from the face image. A verification operation is carried out for the group of rough features and the group of the fine features. A next unlocking process is carried out when the verification of the group of rough features and the group of fine features is passed.

The computer program executed by the processor to carry out the action of extracting a group of rough features and a group of fine features from the face image is executed by the processor to carry out the following actions. First, outline extraction is carried out for the face image to obtain an outline as the group of the rough features. At least one facial feature area is obtained by carrying out image segmentation for the face image. Feature point extraction is carried out for the at least one facial feature area to obtain multiple features points, and the obtained multiple feature points are taken as the group of fine features.

The computer program executed by the processor to carry out the action of carrying out a verification operation for the group of rough features and the group of fine features is executed by the processor to carry out actions. First, a first gravity center of the face image is determined according to the group of rough features. A first Euclidean distance between the first gravity center and a preset second gravity center is determined. A first mass center is determined according to the group of fine features when the first Euclidean distance is within a first preset range. A second Euclidean distance between the first mass center and a preset second mass center is determined. The verification is determined to be passed when the second Euclidean distance is within a second preset range.

The computer program executed by a processor further to carry out following actions. First, obtain ambient brightness. Second, determine a first lower threshold value, a first recognition threshold value, a second lower threshold value, and a second recognition threshold value, corresponding to the ambient brightness.

The computer program executed by the processor to carry out the action of carrying out a verification operation for the group of rough features and the group of fine features is executed by the processor to carry out actions. First, a first match value between the group of rough features and a preset group of rough features is determined. A second match value between the group of fine features and a preset group of fine features is determined. The verification is determined to be passed, when the first match value is greater than the first lower threshold value, the second match value is greater than the second lower threshold value, and a sum of the first match value and the second match value is greater than a sum of the first recognition threshold value and the second recognition threshold value.

Implementations of the present disclosure also provide a computer program product. The computer program product includes a non-transitory computer-readable storage medium storing computer programs. The computer programs are operable with a computer to perform all or part of the operations of any method for controlling unlocking described in the above-described method implementation.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, a mechanical connection, or other forms of connections.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electronic device, comprising:
an application processor (AP), wherein the AP is configured to:
extract a group of rough features and a group of fine features from a face image,
carry out a verification operation for the group of rough features and the group of fine features, and
carry out a next unlocking process when verification of the group of rough features and the group of fine features is passed; and
a face recognition device coupled to the AP, wherein the face recognition device is configured to obtain the face image;
wherein the AP configured to carry out the verification operation for the group of rough features and the group of fine features is configured to:
determine a first gravity center of the face image according to the group of rough features;
determine a first Euclidean distance between the first gravity center and a preset second gravity center;
determine a first mass center according to the group of fine features when the first Euclidean distance is within a first preset range;
determine a second Euclidean distance between the first mass center and a preset second mass center; and
determine that the verification is passed when the second Euclidean distance is within a second preset range; or
wherein:
the electronic device further comprises an ambient light sensor configured to obtain ambient brightness;
the AP is further configured to determine a first lower threshold value, a first recognition threshold value, a second lower threshold value, and a second recognition threshold value, corresponding to the ambient brightness; and
the AP configured to carry out the verification operation for the group of rough features and the group of fine features is further configured to:

determine a first match value between the group of rough features and a preset group of rough features;

determine a second match value between the group of fine features and a preset group of fine features; and determine that the verification is passed when the first match value is greater than the first lower threshold value, the second match value is greater than the second lower threshold value, and a sum of the first match value and the second match value is greater than a sum of the first recognition threshold value and the second recognition threshold value.

2. The electronic device of claim 1, wherein the AP configured to extract the group of rough features and the group of fine features from the face image is further configured to:

carry out outline extraction for the face image to obtain an outline as the group of rough features;

carry out image segmentation for the face image to obtain at least one facial feature area; and carry out feature point extraction for the at least one facial feature area to obtain multiple feature points as the group of fine features.

3. The electronic device of claim 2, wherein the at least one facial feature area comprises at least one area selected from: eyes, ears, a nose, eyebrows, and a mouse.

4. The electronic device of claim 1, wherein the AP is coupled to the face recognition device and the ambient light sensor via a bus line.

5. The electronic device of claim 1, wherein the AP is further configured to:

determine an average brightness value of the face image; and extract the group of rough features and the group of fine features from the face image when the average brightness value is lower than a preset brightness value.

6. The electronic device of claim 1, wherein the face recognition device comprises a front camera.

7. A method for controlling unlocking, comprising:

obtaining a face image;

extracting a group of rough features and a group of fine features from the face image;

carrying out a verification operation for the group of rough features and the group of fine features; and carrying out a next unlocking process when verification of the group of rough features and the group of fine features is passed;

wherein the carrying out the verification operation for the group of rough features and the group of fine features comprises:

determining a first gravity center of the face image according to the group of rough features;

determining a first Euclidean distance between the first gravity center and a preset second gravity center;

determining a first mass center according to the group of fine features when the first Euclidean distance is within a first preset range;

determining a second Euclidean distance between the first mass center and a preset second mass center; and determining that the verification is passed when the second Euclidean distance is within a second preset range; or wherein the method further comprises:

obtaining ambient brightness; and determining a first lower threshold value, a first recognition threshold value, a second lower threshold value, and a second recognition threshold value, corresponding to the ambient brightness, wherein the carrying out the verification operation for the group of rough features and the group of fine features comprises:

determining a first match value between the group of rough features and a preset group of rough features;

determining a second match value between the group of fine features and a preset group of fine features; and determining that the verification is passed when the first match value is greater than the first lower threshold value, the second match value is greater than the second lower threshold value, and a sum of the first match value and the second match value is greater than a sum of the first recognition threshold value and the second recognition threshold value.

8. The method of claim 7, wherein the extracting the group of rough features and the group of fine features from the face image comprises:

carrying out outline extraction for the face image to obtain an outline as the group of rough features;

carrying out image segmentation for the face image to obtain at least one facial feature area; and carrying feature point extraction for the at least one facial feature area to obtain multiple feature points as the group of fine features.

9. The method of claim 8, wherein the at least one facial feature area comprises at least one area selected from: eyes, ears, a nose, eyebrows, and a mouse.

10. The method of claim 7, further comprises:

determining an average brightness value of the face image; and carrying out the extracting a group of rough features and a group of fine features from the face image when the average brightness value is lower than a preset brightness value.

11. A non-transitory computer-readable storage medium storing a computer program which, when executed by a processor, causes the processor to:

obtain a face image;

extract a group of rough features and a group of fine features from the face image;

carry out a verification operation for the group of rough features and the group of fine features; and carrying out a next unlocking process when verification of the group of rough features and the group of fine features is passed;

wherein the computer program executed by the processor to carry out the verification operation for the group of rough features and the group of fine features is executed by the processor to:

determine a first gravity center of the face image according to the group of rough features;

determine a first Euclidean distance between the first gravity center and a preset second gravity center;

determine a first mass center according to the group of fine features when the first Euclidean distance is within a first preset range;

determine a second Euclidean distance between the first mass center and a preset second mass center; and determine that the verification is passed when the second Euclidean distance is within a second preset range; or wherein the computer program is further executed by the processor to:

obtain ambient brightness; and determine a first lower threshold value, a first recognition threshold value, a second lower threshold value, and a second recognition threshold value, corresponding to the ambient brightness;

wherein the computer program executed by the processor to carry out the verification operation for the group of rough features and the group of fine features is executed by the processor to:

determine a first match value between the group of rough features and a preset group of rough features;

determine a second match value between the group of fine features and a preset group of fine features; and determine that the verification is passed when the first match value is greater than the first lower threshold value, the second match value is greater than the second lower threshold value, and a sum of the first match value and the second match value is greater than a sum of the first recognition threshold value and the second recognition threshold value.

12. The non-transitory computer-readable storage medium of claim 11, wherein the computer program executed by the processor to extract the group of rough features and the group of fine features from the face image is executed by the processor to:

carry out outline extraction for the face image to obtain an outline as the group of rough features;

carry out image segmentation for the face image to obtain at least one facial feature area; and carry out feature point extraction for the at least one facial feature area to obtain multiple feature points as the group of fine features.

13. The non-transitory computer-readable storage medium of claim 12, wherein the at least one facial feature area comprises at least one area selected from: eyes, ears, a nose, eyebrows, and a mouse.

14. The non-transitory computer-readable storage medium of claim 11, wherein the computer program is further executed by the processor further to determine an average brightness value of the face image; and the computer program executed by the processor to extract the group of rough features and the group of fine features from the face image is executed by the processor to extract the group of rough features and the group of fine features from the face image when the average brightness value is lower than a preset brightness value.

* * * * *